United States Patent [19]
Morgan

[11] 4,380,093
[45] Apr. 19, 1983

[54] BICYCLE HANDLEBAR GRIP

[76] Inventor: Clyde R. Morgan, Box 302, Coeur d'Alene, Id. 83814

[21] Appl. No.: 211,297

[22] Filed: Nov. 28, 1980

[51] Int. Cl.³ .............................................. B62K 21/26
[52] U.S. Cl. ............................... 16/110 R; 16/111 R; 16/DIG. 12; 74/551.9; D12/114
[58] Field of Search ..................... 74/551.9; 16/110 R, 16/111 A, 111 R, DIG. 12, DIG. 19; D12/114

[56] References Cited
U.S. PATENT DOCUMENTS
366,775  7/1887  Jeffery ................................ 74/551.9

FOREIGN PATENT DOCUMENTS
804757   8/1936  France ............................... 74/551.9
1221709  6/1960  France ............................... 74/551.9
19105    of 1909  United Kingdom ............... 74/551.9

Primary Examiner—Paul A. Bell
Attorney, Agent, or Firm—Wells, St. John & Roberts

[57] ABSTRACT

A bicycle handlebar grip is disclosed that is adapted to fit over the "cross-over" and "turn-of-bar" segments of a racing bicycle handlebar. The grip is shaped to allow a comfortable hand grip in any of several positions. The grip also includes provisions for reducing transmission of vibration from the handlebar to the rider's hand, thus avoiding physical ailments such as "biker's nerve palsy".

8 Claims, 8 Drawing Figures

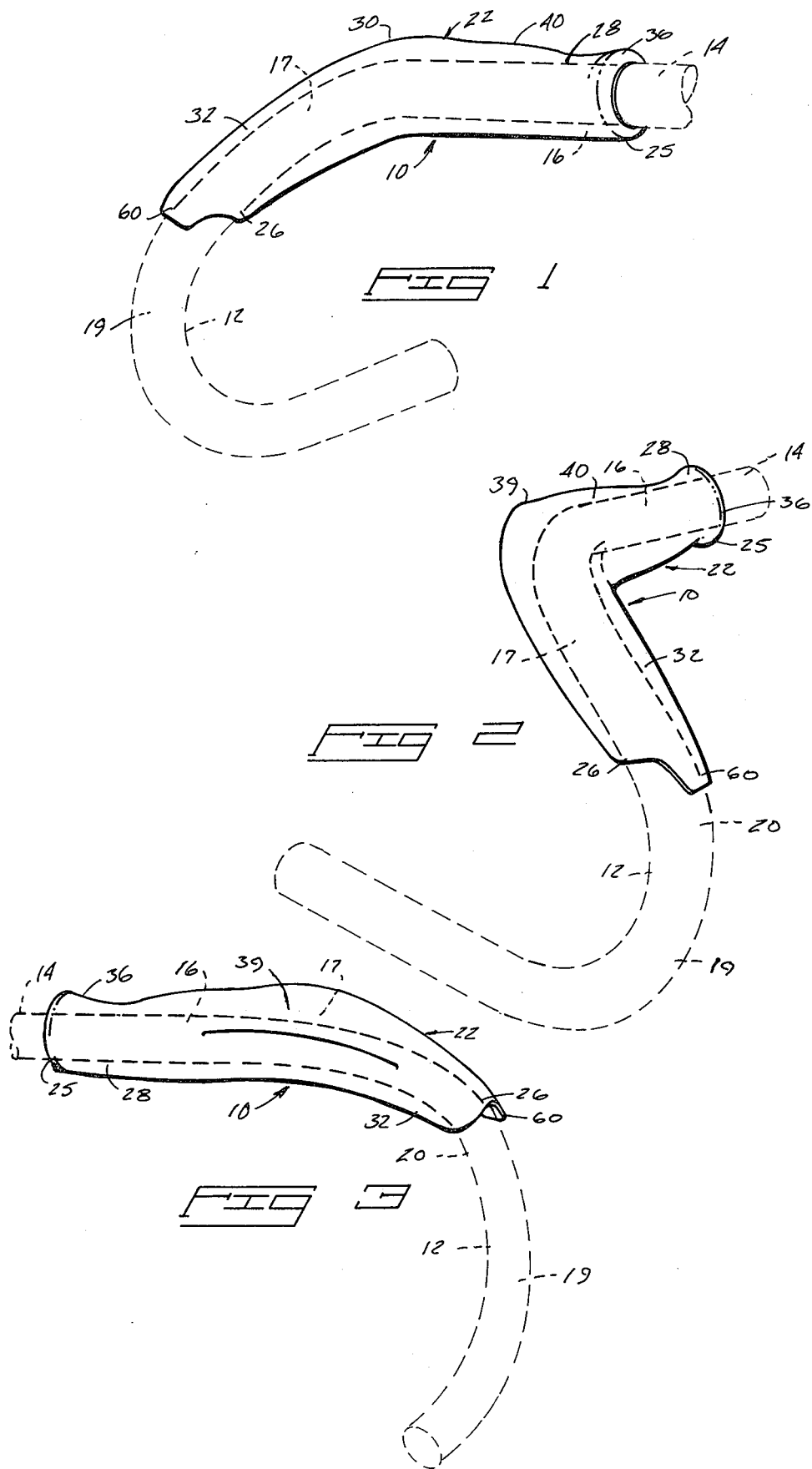

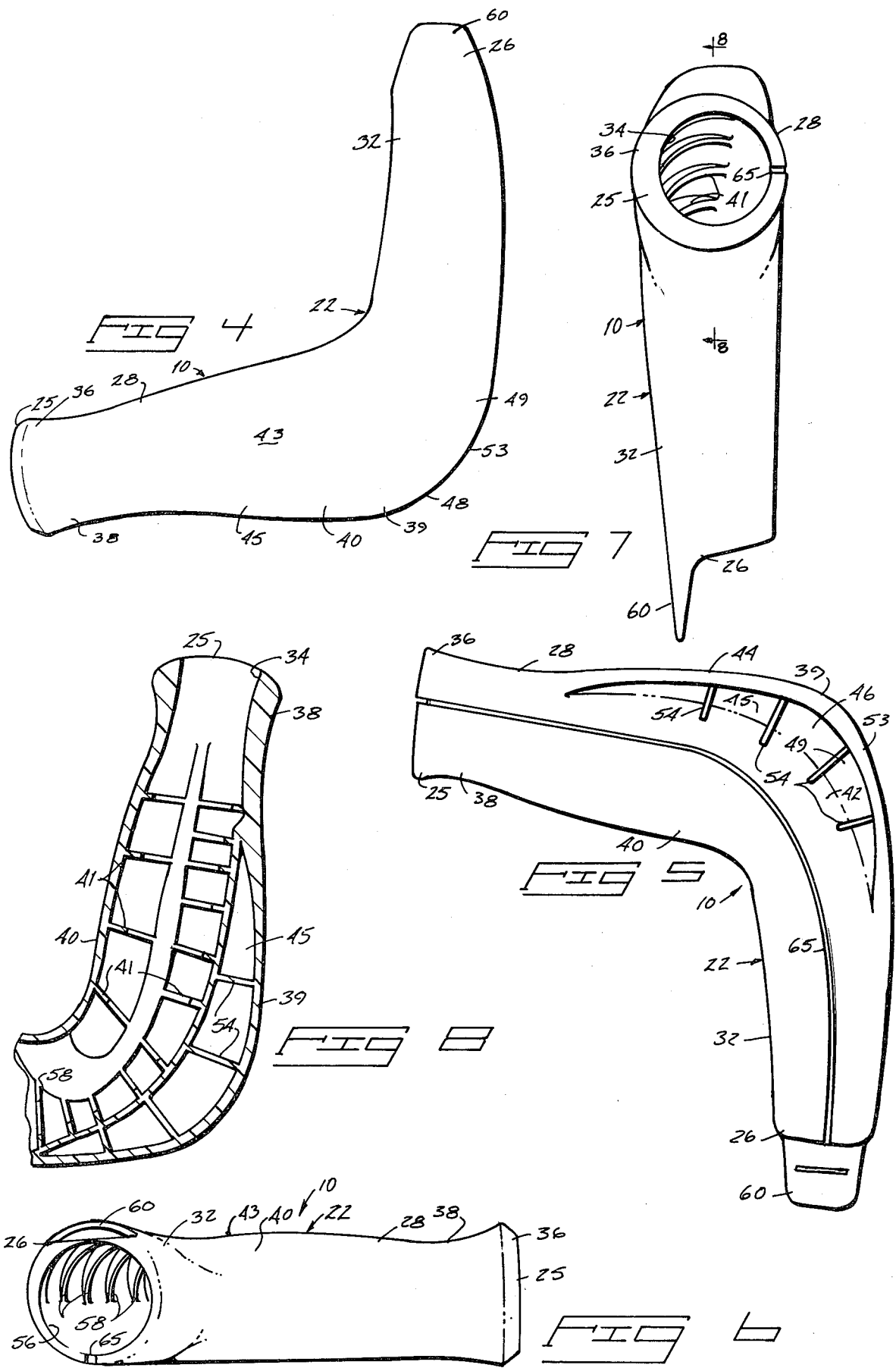

BICYCLE HANDLEBAR GRIP

TECHNICAL FIELD OF THE INVENTION

This invention relates to handlebar grips for bicycles and more particularly to grips for "drop" type or "racing" bicycle handlebars used frequently on lightweight touring or racing bicycles.

BACKGROUND OF THE INVENTION

Lightweight bicycles used for racing, touring, and for general recreational transportation, typically include what is termed a "drop" or "racing" handlebar with low, longitudinally oriented hand grips at ends of a compound curved tubular bar. Upper transverse "crossover" parts of the bar are also often used as hand grips when the rider wants to assume a more upright stance on the bicycle. The upper grips are most frequently used by persons who do not feel comfortable bending over the lower grips, or who like a variation in position while riding. There are two basic forms of hand grips used along the crossover portion. An overhand grip on the straight horizontal part of the bar is often used, and secondly, an underhand "thumb-over-brake" position at the top curved parts of the dropped handle. There is usually no hand grip or pad provided on the cross bar area so the riders hands and arms become quickly fatigued.

Racing type bicycle handlebars are generally constructed of rigid, tubular metal that transfers the vibration from the bicycle directly to the riders hands. It is not unusual for a rider, either during a race or on a prolonged ride to become fatigued from vibration that is transmitted directly from the bicycle handlebar. In fact, bicycle riders occasionally develop what is called "biker's nerve palsy" in the palms of their hands from such vibration.

Numerous types of handlebar grips have been designed to make bicycle riding more comfortable and to minimize the slippage of the hand on the handlebar. Often, conventional handlebar grip attachments are provided merely to increase the gripping surface and slip resistance. Various types of contoured grips have been designed which have indentations and projections to provide a desirable gripping surface. Surface contoured grips have also been placed on bars to increase the grip capability of the rider. Examples of such designs are illustrated in U.S. Pat. Nos. D. 144,446; D. 231,044 and D. 248,616.

Other forms of grips have been designed in an attempt to contour the grip more conveniently to the shape of the rider's hand in order to support the hand more comfortably on the handlebar. An example of such a grip is illustrated in the Jeffery, U.S. Pat. No. 366,775.

More recently, tubular padded grips have been developed of open cellular foam material that is placed on the handlebars to provide cushioning.

One of the problems with such open cellular cushioning material is its compressability. The ability of the material to absorb vibrations decreases with the amount of compression. Thus, the material, when compressed, serves as a slight cushioning material and enables the rider to more securely grip the bar. When the rider's hand is pressing against the handlebar, the open cell material compresses, giving way until the cushion material "bottoms out". Consequently, such open cellular foam material does not provide the desired tactile response and does not readily absorb vibration. Additionally, the cellular foam material is typically formed with a continuous cross-sectional configuration without consideration to the anatomical features of the rider's hands. Bone structures are much closer to the skin surface in some areas of the hand than others. Such surfaces should be afforded more protection against vibration than areas padded with muscle tissue and fat.

One of the objects of this invention is to provide a handlebar grip for the crossover part of a racing or drop type bicycle handlebar that will allow the rider to securely grip the handlebar without requiring substantial squeezing or gripping pressure.

Another object is to provide such a grip that enables the hand to assume a comfortable orientation that is less fatiguing than previous handlebar configurations.

A still further object of this invention is to provide a handlebar grip for the crossover portion of a racing bicycle handlebar that does not readily compress but which has the ability to absorb vibration and shock, therefore minimizing transfer of vibration and shock to the rider.

A still further object of this invention is to provide a handlebar grip that is adapted for both the overhand grip hand orientation and the underhand "thumb-over-brake" grip hand orientation.

BRIEF DESCRIPTION OF THE DRAWINGS

A preferred embodiment of this invention is illustrated in the accompanying drawings in which:

FIG. 1 is a pictorial view of the subject handlebar grip showing the handlebar grip mounted to a bicycle handlebar (the handlebar being shown in dashed line);

FIG. 2 is a pictorial view of the bicycle handlebar grip mounted on the handlebar as seen from the left in FIG. 1;

FIG. 3 is a pictorial view of the grip mounted on a handlebar as seen from the left in FIG. 2;

FIG. 4 is a top plan view of the present grip;

FIG. 5 is a bottom plan view;

FIG. 6 is an outside end view;

FIG. 7 is an inside end view; and

FIG. 8 is a sectional view taken along line 8—8 in FIG. 7.

DETAILED DESCRIPTION OF A PREFERRED EMBODIMENT

The present handlebar grip is generally designated in the drawings by the numeral 10. The present grip 10 is provided for mounting on a racing or drop type bicycle handlebar 12 as illustrated in dotted lines in FIGS. 1 through 3. The racing handlebar 12 is typically provided on lightweight racing, touring, or general use bicycles and has become a rather standard handlebar form for all "10 speed" bicycles, independently of whether the bicycle is used for racing.

The typical racing handlebar 12 is constructed of a tubular material that is bent at several locations forming a highly contoured shape. The handlebar 12 generally has a crossover portion 14 that extends outwardly along a straight section 16 from the center line or steering axis of the handlebar. The crossover portion leads to gradual bends or "turn-of-the-bar" sections 17 defining a transition from the straight transverse part of the crossover into drop sections 19. The drop sections 19 and "turn-of-the-bar" sections 17 are joined integrally at hand brake lever attachment sections 20 (the brake lever assembly is not shown).

The present handlebar grip 10 is provided with a "L" shaped body 22 having an open bore that is curved to receive the crossover and turn-of-the-bar handlebar portions 14 and 17. The body includes an inner end 25 adjacent the crossover section 14 and an outer end 26 directly adjacent the brake lever attachment section 20.

The L-shaped body 22 includes a crossover segment 28 that leads into a "turn-of-the-bar" segment 32. The segments 28 and 32 provide a comfortable grip by the rider in at least three different hand positions. Firstly, the rider may grip the crossover segments 28 in an overhand manner. The turn-of-bar segments 32 can also be gripped by the rider with hands in an underhand relationship. In another grip the thumbs and forefingers straddle the brake lever brackets in an overhand position with the "web" between the thumbs and forefingers resting against the brake lever bracket (not shown).

The crossover body segment 28 includes an elongated annular wall 34 that is complementary to the crossover section of the handlebar. The annular wall 34 includes an enlargement 36 at the inner body end 25. The enlargement 36 is directly adjacent to a reduced neck area 38 adapted to accommodate the rider's index finger, web of the thumb, and thumb when the segment 28 is gripped in the overhand position. The annular wall 34 includes a progressively increasing diameter wall section 40 that extends to the turn-of-bar segment 32. The increasing diameter wall section 40 is provided to comfortably accommodate the remaining fingers of the hand and to cushion the hand from shock and vibration.

The crossover segment 28 includes a number of spaced internal radial ribs 41. The ribs 41 are spaced apart along the wall 34 to form finger indentations 39 when the segment 28 is squeezed in the rider's hands. The flexible material thus "gives way" resiliently to lend a positive tactile feel without substantial "give" between the rider's fingers and handlebar.

The turn-of-bar segment 32 includes an outward elbow projection 39 that extends radially outward to provide cushioned support for the heel of the rider's palm. The projection 39 extends tangentially from an upper wall surface 43 (FIG. 4) of the annular wall portion 40. The projection includes a flexible wall 44 (FIG. 5) that is integral with the body 22 and will flex in response to forces applied thereto in order to dampen and minimize transmission of vibration from the handlebar to the rider's hand. The flexible wall 44 extends radially outward and rearwardly in a cantilevered fashion from a base 45. The wall base 45 intersects tangentially with the upper surface 43 to receive and support the heel of the rider's palm. The wall and base extend in a first flared section 46 (FIG. 5) in tangential relation to the upper surface 43 toward the inward body end 25. The flared section 46 extends inwardly toward the inward end 25 from an apex or sharply rounded corner 48 of the projection. A second flared section 49 extends forwardly from the apex 48 and in tangential relation to the upper surface 43. The flared section 49 therefore extends toward the outer body end 26. Both flared sections 46 and 49, and the apex 48, terminate outwardly in a uniformly downward curved wall 53 that is tangential with the flexible wall 44. The radial distance from the center axis of the handlebar decreases from the apex 48 toward the inward end 25 along flared section 46. The radial distance decreases forwardly along the flared section 49 from apex 48. The joined flared sections therefore form a crescent shape along the under surface of the body as shown in FIG. 5.

Radial ribs 54 extend integrally outward from the annular wall 42 underneath the flexible wall 44 to the curved surface 53. The ribs 54 are formed of the same material and are integral with the remainder of the body 22. Preferably, several of the ribs are provided in spaced relationship along the length of the elbow projection. The ribs 54 are also preferably situated in upright orientations when the grip is mounted to the handlebar 12. The ribs 54 will therefore prevent the flexible wall 44 from collapsing but will flex in response to radial force supplied by the rider's hand.

The turn-of-bar segment 32 includes an interior annular wall section 56 (FIG. 6) formed integrally with the inner annular walls 42 and 34. The wall 56 is broken along its length by a number of internal ribs 58 that closely resemble the ribs 41 described above. The ribs 58, like the ribs 41, are situated within the annular wall 34. The ribs are preferably spaced apart along the length of the turn-of-bar segment 32 to space the wall slightly outward of the handlebar, thereby producing an air space in which the walls can flex when gripped by the rider's fingers. The wall will deflect when so gripped to produce a comfortable tactile feel while remaining sufficiently rigid to avoid "bottoming out" directly against the rigid handlebar.

The turn-of-bar segment 32 includes, at the outer end 26, a protruding flexible flange 60. The flange 60 is designed to be pressed against the typical brake mounting bracket (not shown) that is ordinarily mounted at the brake lever attachment location 20. The flange will curve gradually when installed against the brake bracket and is adapted to comfortably support the rider's thumb tip. The flange can also be used to brace the web between the thumb and forefinger when the rider assumes an overhand grip on the turn-of-bar segment 32.

The elbow projection 39 and ribs are provided both for rider hand comfort and for absorbing vibration of the handlebar to thereby prevent the vibration from being transmitted to the palm and fingers of the rider's hands. These features greatly reduce fatigue due to vibration and greatly reduce the chances that the cyclist will become inflicted with "biker's nerve palsy". It should be noted that the nerves leading to the fingers pass through the palm area. It is therefore not unusual with traditional grips, for these nerves to undergo trauma from vibration during prolonged riding. Consequently, one of the major objectives of this invention is to reduce the occurence of "biker's hand palsy" in addition to adding significantly to the rider's comfort. The vibration absorbing features are of such a nature that the rider is nob able to substantially compress or deflect the portions of the grip 10 by merely increasing gripping pressure. Consequently, the palm and fingers are supported away from the handlebar. The ribs and material situated between the hand and handlebar reduce the transmission of vibration from the handlebar without sacrificing comfort or tactile feel.

With prior art open cell foam grips, the bike rider can readily compress the foam by increasing his grip until the foam "bottoms out". The "bottomed out" foam lends the rider a reasonably tactile feel in relation to the rigid handlebar. However, the thoroughly compressed foam will absorb very little vibration. Instead there is substantial transmission of the vibration through the compressed foam to the hand. In contrast, the vibration absorbing characteristics of the present grip 10 maintain the structural integrity of the grip so excellent tactile interface is maintained between the fingers and palms while supporting and minimizing transmission of vibration to the hands.

It is preferred that the grip 10 is formed of a unitary element from injection molding utilizing vinyl, urethane, or synthetic rubber having a modulus of elasticity between 500 psi and 5,000 psi in order to provide substantial flexibility without providing compressibility that is characterized by open cellular foam material.

The present grip is mounted to the bicycle handlebar by provision of an elongated slit 65 extending from the inner end 28 to the outer end 26 along a bottom surface of the grip. The slit enables the annular wall to be opened and pressed over the complementary portions of the handlebar. The grip can then be secured in position on the handlebar, with the flange 60 pressed and bent outwardly against the hand brake frame by adhesive, sewing, or other appropriate and conventional means of attachment.

The rider may use the grip, as described above, either in an overhand position wherein the palms face downwardly with the heel of the palm resting against the cantilevered elbow projection 39 and the thumb web and fore finger encircling the reduced necks 38. The rider may also assume an underhand grip by grasping the turn-of-bar segment 32 with palms facing somewhat up and inwardly, with the fingers extending below the segment 32 and subsequently along an inside facing surface of the grip.

It should be noted that the above described embodiment is illustrative of this invention and that other embodiments may be devised that fall within the scope of the invention as set forth in the following claims.

What I claim is:

1. A handlebar grip for the crossover and turn-of-bar portion of a racing bicycle handlebar in which such portion is substantially tubular about a central axis and includes (1) a substantially straight section extending laterally outward from a central portion of the handlebar, and (2) turn-of-bar section extending from the straight section forward terminating at a drop portion having a brake lower attachment location, comprising:

a flexible "L" shaped body mountable on the crossover and turn-of-bar portion with a complementary annular bore extending from one end to an opposite end to receive the crossover and turn-of-bar portion therein;

said "L" shaped body having (1) a crossover segment extending from the one end along the substantially straight section and (2) a turn-of-bar segment extending from the crossover segment forward to the drop portion terminating at the brake lever attachment location;

said turn-of-bar segment having an elbow projection formed integrally therewith that projects outward from the central axis to enlarge the turn-of-bar segment and provide support for the heel portion of the biker's hand independently of whether the biker grips the crossover segment in an overhand grip or grips the turn-of-bar section in a side underhand grip.

2. The handlebar grip as defined in claim 1 wherein the elbow projection projects outward from the turn-of-bar segment and extends inwardly in one direction substantially tangential to the crossover segment and extends forward in another direction substantially tangential with the turn-of-bar section.

3. The handlebar grip as defined in claim 1 wherein the radial distance of the projection from the center axis progressively decreases from an apex toward the crossover segment and progressively decreases from the apex toward the turn-of-bar segment.

4. The handlebar grip as defined in claim 1 wherein the elbow projection has an upper surface and includes a flexible wall that extends radially outward and rearward with the wall having a base that intersects substantially tangentially with the upper surface to receive and support the heel of the palm thereon.

5. The handlebar grip as defined in claim 1 wherein the elbow projection comprises a flexible wall that extends outward and rearward from the center axis in a cantilever fashion to flex in response to forces applied thereto to dampen and minimize the transmission of vibration from the handlebar to the palm of the hand.

6. The handlebar grip as defined in claim 5 wherein the elbow projection further includes flexible ribs that extend radially outward supporting and stiffening the flexible wall to prevent the wall from collapsing downward.

7. The handlebar grip as defined in claim 1 wherein the crossover segment includes (1) an annular wall extending along the straight section and (2) a plurality of annular ribs spaced at intervals along the crossover segment to normally support the annular wall radially spaced from the straight section of the handlebar in which the spacing between the ribs corresponds with the distance between the fingers to permit the biker to squeeze the wall and deflect the wall intermediate the ribs to form temporary finger indentations to minimize lateral sliding of the hand.

8. The handlebar grip as defined in claim 1 wherein the turn-of-bar segment has a flexible flange at the brake lever attachment location to receive the support the biker's thumb tip when the biker grips the turn-of-bar segment in a side underhand grip.

* * * * *